(12) United States Patent
Gomez-Gurza

(10) Patent No.: US 9,895,027 B2
(45) Date of Patent: Feb. 20, 2018

(54) EGG-BREAKING SYSTEMS AND METHODS

(71) Applicant: Gullfoss Engineering, LLC, Northville, MI (US)

(72) Inventor: Santiago Gomez-Gurza, Northville, MI (US)

(73) Assignee: Gullfoss Engineering, LLC, Northville, MI (US)

( * ) Notice: Subject to any disclaimer, the term of this patent is extended or adjusted under 35 U.S.C. 154(b) by 466 days.

(21) Appl. No.: 14/164,095

(22) Filed: Jan. 24, 2014

(65) Prior Publication Data

US 2015/0208869 A1  Jul. 30, 2015

(51) Int. Cl.
*A47J 43/14* (2006.01)

(52) U.S. Cl.
CPC .................................. *A47J 43/145* (2013.01)

(58) Field of Classification Search
CPC ..................................................... A47J 43/145
USPC .................. 99/498, 499, 500, 568, 571–579
See application file for complete search history.

(56) References Cited

U.S. PATENT DOCUMENTS

| | | | |
|---|---|---|---|
| 2,524,844 A | 10/1950 | Smith | |
| 2,646,163 A | 7/1953 | Sigler | |
| 2,718,906 A * | 9/1955 | Adams | A47J 43/145 99/486 |
| 2,760,536 A * | 8/1956 | Willsey | A47J 43/145 198/403 |
| 2,966,184 A * | 12/1960 | Willsey | A47J 43/145 99/498 |
| 3,137,330 A * | 6/1964 | MacLagan | A47J 43/145 198/408 |
| 3,470,925 A * | 10/1969 | Noren | A47J 43/145 99/497 |
| 3,532,144 A * | 10/1970 | Halvorson | A47J 43/145 99/498 |
| 3,542,101 A * | 11/1970 | Klint | A47J 43/145 99/493 |
| 3,950,557 A | 4/1976 | Kheng | |
| 4,134,333 A * | 1/1979 | Warren | A01K 43/00 99/498 |
| 4,137,838 A * | 2/1979 | Warren | A47J 43/145 99/500 |
| 4,541,330 A | 9/1985 | Fujimura | |
| 4,554,866 A | 11/1985 | Hampton | |
| 4,605,562 A | 8/1986 | Fujimura et al. | |

(Continued)

FOREIGN PATENT DOCUMENTS

| | | |
|---|---|---|
| CH | 686548 A5 | 4/1996 |
| CN | 2240859 Y | 10/1996 |

(Continued)

OTHER PUBLICATIONS

European Patent Office, Supplementary European Search Report, dated Aug. 17, 2017, pp. 1-7, European Patent Office, Munich, Germany.

*Primary Examiner* — David Angwin
*Assistant Examiner* — Frederick Calvetti
(74) *Attorney, Agent, or Firm* — Thomas B. McGurk

(57) ABSTRACT

An egg-breaking system is provided that includes a plurality of nodes arranged in which one or more cracker assemblies are disposed. The nodes are arranged in a matrix of rows and columns within the egg-breaking system. The egg-breaking system can be used in an egg processing line in which eggs are subjected to a variety of processing steps.

15 Claims, 11 Drawing Sheets

(56) References Cited

U.S. PATENT DOCUMENTS

| | | | |
|---|---|---|---|
| 4,773,322 A * | 9/1988 | Willsey | A47J 43/145 99/497 |
| 4,799,423 A | 1/1989 | Wilsey | |
| 4,919,042 A | 4/1990 | Rasmussen | |
| 5,085,139 A * | 2/1992 | Pellegrinelli | A47J 43/145 99/497 |
| 5,277,320 A * | 1/1994 | Corkill | A01K 43/00 209/511 |
| 5,293,815 A | 3/1994 | Tomosue | |
| 5,325,768 A * | 7/1994 | van den Hazel | A47J 43/145 99/497 |
| 5,377,583 A | 1/1995 | Tomosue | |
| 5,410,953 A | 5/1995 | Yamashita | |
| 5,415,084 A | 5/1995 | Tomosue | |
| 5,438,919 A | 8/1995 | Idowu | |
| 5,460,083 A * | 10/1995 | Hutchinson | A47J 43/145 134/131 |
| 5,613,429 A | 3/1997 | Pettazzi | |
| 5,617,782 A | 4/1997 | Thomas | |
| 5,628,246 A * | 5/1997 | Kristensen | A23J 1/09 99/497 |
| 5,634,397 A * | 6/1997 | Hutchinson | A01K 43/005 134/131 |
| 5,858,434 A * | 1/1999 | Thomas | A47J 43/145 426/299 |
| 6,095,038 A | 8/2000 | Cerro | |
| 6,234,070 B1 * | 5/2001 | Hutchison | A47J 43/145 30/120.1 |
| 7,363,853 B2 | 4/2008 | Dolub | |
| 7,763,302 B2 * | 7/2010 | Hairsine | A23J 1/09 426/478 |
| 7,988,792 B2 * | 8/2011 | Cavallaro | A01K 43/005 134/131 |
| 2007/0251096 A1 | 11/2007 | Smith | |
| 2008/0160145 A1 | 7/2008 | Dolub | |
| 2009/0217826 A1 * | 9/2009 | Kristensen | A47J 43/145 99/500 |
| 2010/0291271 A1 * | 11/2010 | Hairsine | A23J 1/09 426/298 |
| 2013/0008475 A1 * | 1/2013 | Robinson | G01N 33/08 134/115 R |
| 2013/0104752 A1 * | 5/2013 | Kwapich | A47J 43/145 99/498 |

FOREIGN PATENT DOCUMENTS

| | | |
|---|---|---|
| CN | 1415228 A | 12/2002 |
| CN | 1526294 A | 10/2003 |
| DE | 4406396 C1 | 5/1995 |
| DE | 19548692 A1 | 6/1997 |
| DE | 19856976 A1 | 2/1998 |
| DE | 19933141 A1 | 1/2001 |
| DE | 102004021315 | 11/2005 |
| EP | 0325385 A1 | 1/1989 |
| EP | 0616775 A2 | 9/1994 |
| EP | 0621001 A1 | 10/1994 |
| EP | 0636335 A1 | 2/1995 |
| EP | 0746998 A1 | 12/1996 |
| EP | 1205140 A1 | 5/2002 |
| EP | 1297769 A2 | 2/2003 |
| EP | 1297769 A2 | 4/2003 |
| JP | 60221038 | 11/1985 |
| NL | 1010910 | 12/1998 |
| RU | 2265362 C2 | 12/2005 |
| SU | 1780693 | 12/1992 |
| WO | WO8905097 A1 | 9/1988 |
| WO | WO0115546 A2 | 3/2001 |
| WO | WO2007095942 A1 | 8/2007 |

* cited by examiner

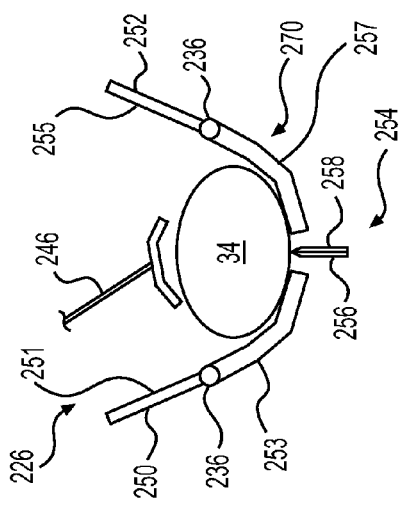
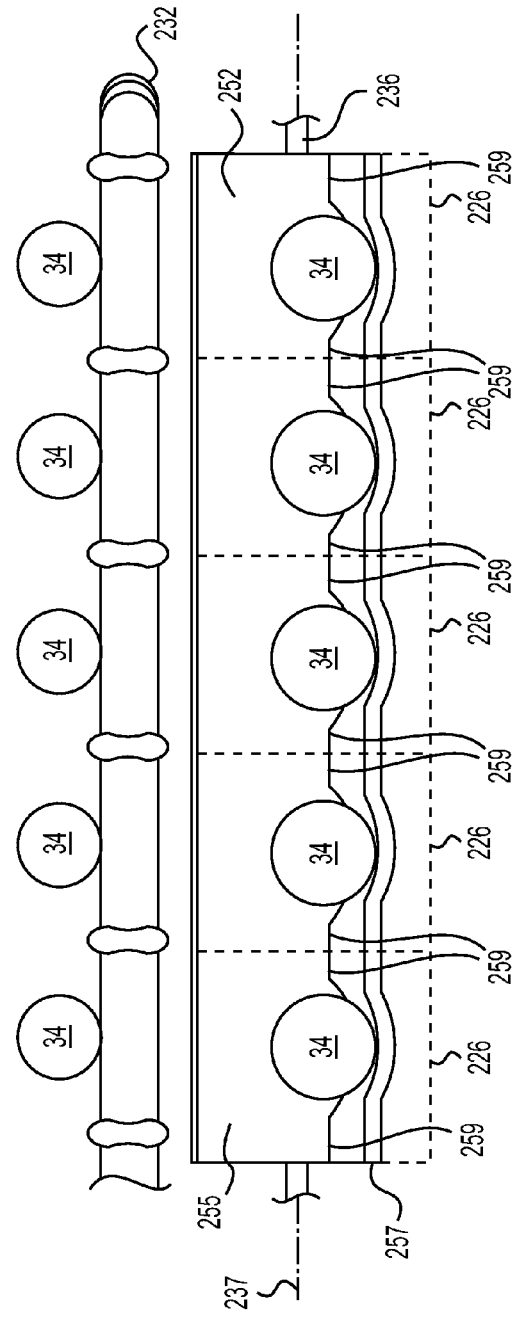
FIG. 10
FIG. 11

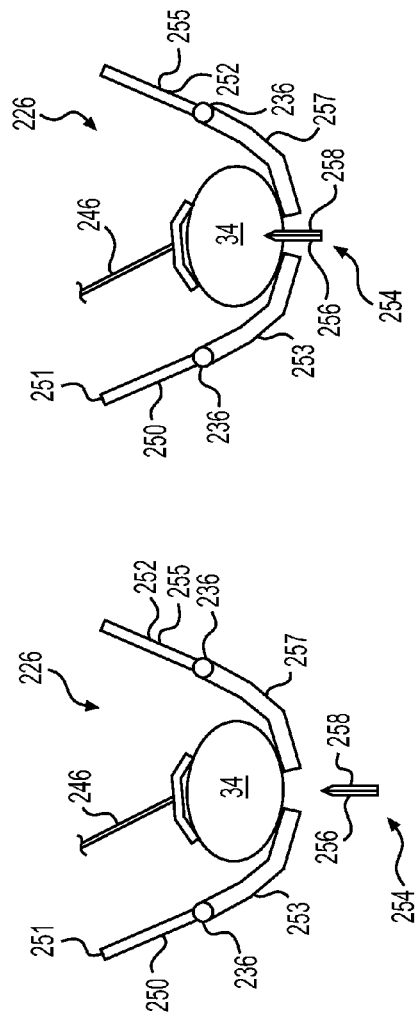
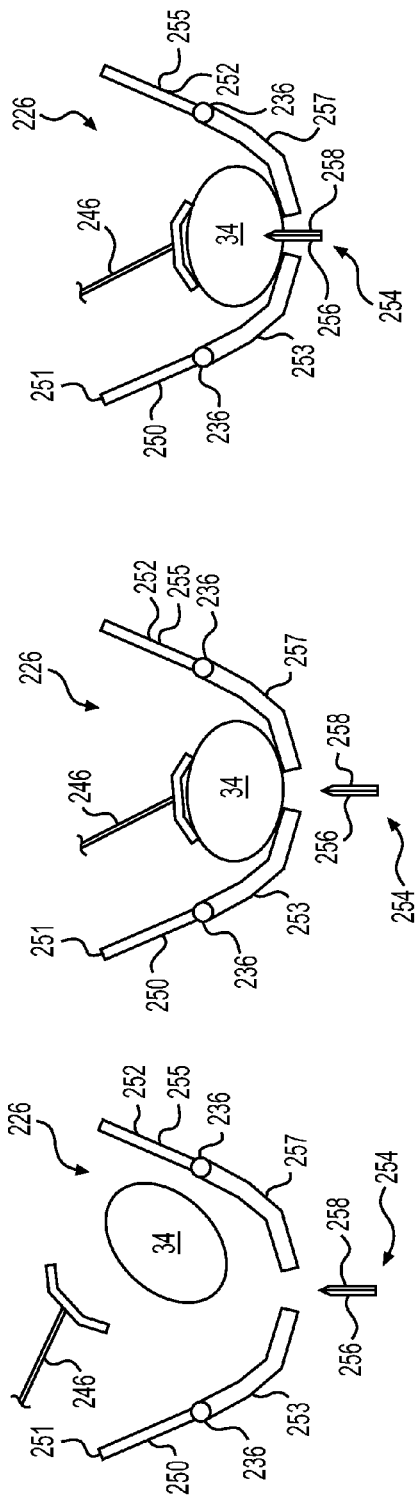
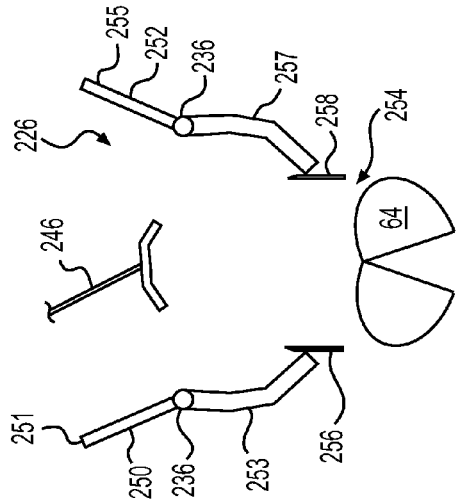
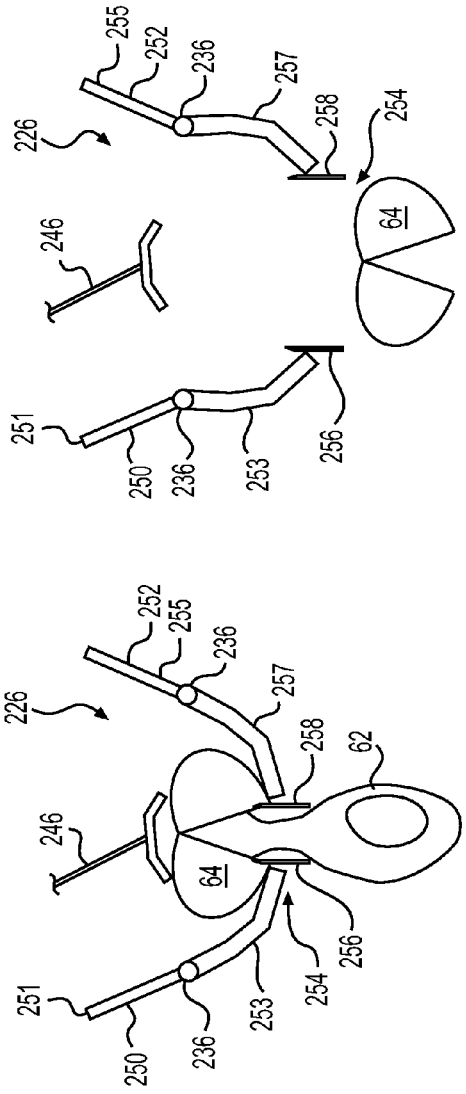

EGG-BREAKING SYSTEMS AND METHODS

TECHNICAL FIELD

The following disclosure is directed to egg processing. More particularly, the present disclosure is directed to systems and methods for breaking eggs.

BACKGROUND

At present, technology for commercial egg-breaking systems has reached its maximum capabilities given the restrictions from government agencies for egg inspection and required floor space in existing egg-breaking operations. The increase in line speeds over the past few years on current egg-breaking technology has resulted in increased production costs and excessive wear and tear and maintenance costs on current systems. The first major change in the industry came from changing the arrangement of egg-breaking devices from a one-egg-at-a-time to technology commonly known as "carousel egg breakers" (moving on an X-Y plane), to "multi-row" egg-breaking where anywhere from two to eighteen eggs are broken at a time on egg-breaking devices mounted on bars that are mounted on a moving carrousel (moving in the X-Z plane). On carrousel breakers, the egg-breaking devices operate approximately 25% of the time (load-open-break-shell disposal). On "multi-row" egg breakers, the egg-breaking device operates between 45% and 50% of the time.

Consequently, there is a need for egg-breaking system and methods by which the increased throughputs in a given footprint can be achieved.

SUMMARY

The present disclosure encompasses an egg-breaking system comprising a cracker assembly array comprising a plurality of nodes aligned in an n×m matrix, wherein n is a first value greater than one and m is a second value greater than one, wherein at least one of n and m is greater than two, wherein each node of the cracker assembly array is disposed in fixed alignment with every other node of the cracker assembly array, wherein each node of the cracker assembly array comprises an egg holder, and wherein an egg cracker is operably aligned with the egg holder. In another aspect, the egg-breaking system further comprises a plurality of egg conveyors operably aligned with the cracker assembly array, wherein each of the plurality of egg conveyors is operably aligned with more than one node of the cracker assembly array. Furthermore, the system can be provided such that each node of the cracker assembly array comprises a plurality of egg holders. Alternatively, the system can be provided such that each node of the cracker assembly array comprises an axis about which the plurality of egg holders are movably disposed. In one aspect, the plurality of egg holders comprises at least four egg holders. In another aspect, the axis can extend through at least two nodes of the cracker assembly array.

Alternatively, the system can be provided such that the cracker assembly array further comprises a tray comprising at least two egg holders. In one aspect, the tray further comprises a first support and a second support. In yet another aspect, at least one of the first and the second supports can be movable. In still a further aspect, the system can be provided such that the first support is movable about a first axis and the second support is movable about a second axis. Furthermore, the system can be configured so that the tray extends through at least two nodes. In another aspect, the system further can comprise a plurality of egg conveyors aligned adjacent the egg cracker assembly array. Additionally, the cracker assembly array can be so provided that n and m are values in the range from two to eighteen. In still a further aspect, the system further can comprise n nodes disposed along a shaft, and wherein the shaft is one of m shafts disposed within the cracker assembly array.

The present disclosure also encompasses an egg-breaking system comprising a cracker assembly array comprising a plurality of nodes, wherein the plurality fixedly-aligned nodes are aligned in at least two columns, wherein each column comprises at least two of the plurality of fixedly-aligned nodes, and wherein each node of the plurality of fixedly-aligned nodes comprises a cracker assembly comprising an egg holder; and, an egg cracker in operable communication with at least one of the plurality of nodes. Furthermore, the system can be so provided that the plurality of fixedly-aligned nodes are aligned in at least two rows. Alternatively, a node of the plurality of fixedly-aligned nodes can comprise a plurality of egg holders, and, furthermore, wherein the plurality of egg holders of the node are movably aligned about an axis. In another aspect, the axis can extend through at least two nodes of the plurality of fixedly-aligned nodes. In yet another aspect, each of the at least two columns of the cracker assembly array can comprise a shaft extending through the fixedly-aligned nodes. Alternatively, each of the fixedly-aligned nodes further can comprise a plurality of egg holders movably connected to the shaft.

In still another aspect, the cracker assembly array further can comprise a tray comprising at least two egg holders, and wherein the tray extends through at least two of the fixedly-aligned nodes. Furthermore, the egg cracker can be in operable communication with at least two of the plurality of fixedly-aligned nodes. In yet another aspect, the egg cracker can comprise a knife. Alternatively, the system further can comprise a plurality of egg conveyors aligned adjacent the egg cracker assembly array.

The present disclosure also encompasses an egg-breaking system comprising a cracker assembly array comprising a plurality of nodes disposed in an n×m matrix, wherein n and m are greater than one, wherein each node of the plurality of nodes is fixedly-aligned relative to every other node of the cracker assembly array, and wherein each of the plurality of nodes comprises at least one cracker assembly comprising an egg holder and an egg cracker. The egg-breaking system further comprises a shaft extending through at least two of the plurality of nodes of the cracker assembly array, wherein at least a portion of at least one cracker assembly in each of at least two nodes of the cracker assembly array are movably mounted to the shaft.

Other objects, advantages and features of the present disclosure are encompassed by the following description and drawings, which are briefly described as follows.

BRIEF DESCRIPTION THE DRAWINGS

FIG. 10 is an end view of a node of the cracker assembly array shown in FIG. 9.

FIG. 11 is a side view of one half of a tray of the cracker assembly shown in FIG. 9 with a conveyor shown.

FIG. 12A is an end view of a node of the cracker assembly array shown in FIG. 9 with an egg provided illustrating a step of a process of egg-breaking encompassing aspects of the present disclosure.

FIG. 12B is another end view of the node shown in FIG. 12A illustrating another step of the process of breaking an egg.

FIG. 12C is yet another end view of the node shown in FIG. 12A illustrating yet another step of the process of breaking an egg.

FIG. 12D is a further end view of the node shown in FIG. 12A illustrating yet another step of the process of breaking an egg.

FIG. 12E is a yet another end view of the node shown in FIG. 12A illustrating another step of the process of breaking an egg.

DETAILED DESCRIPTION

Figure 1:
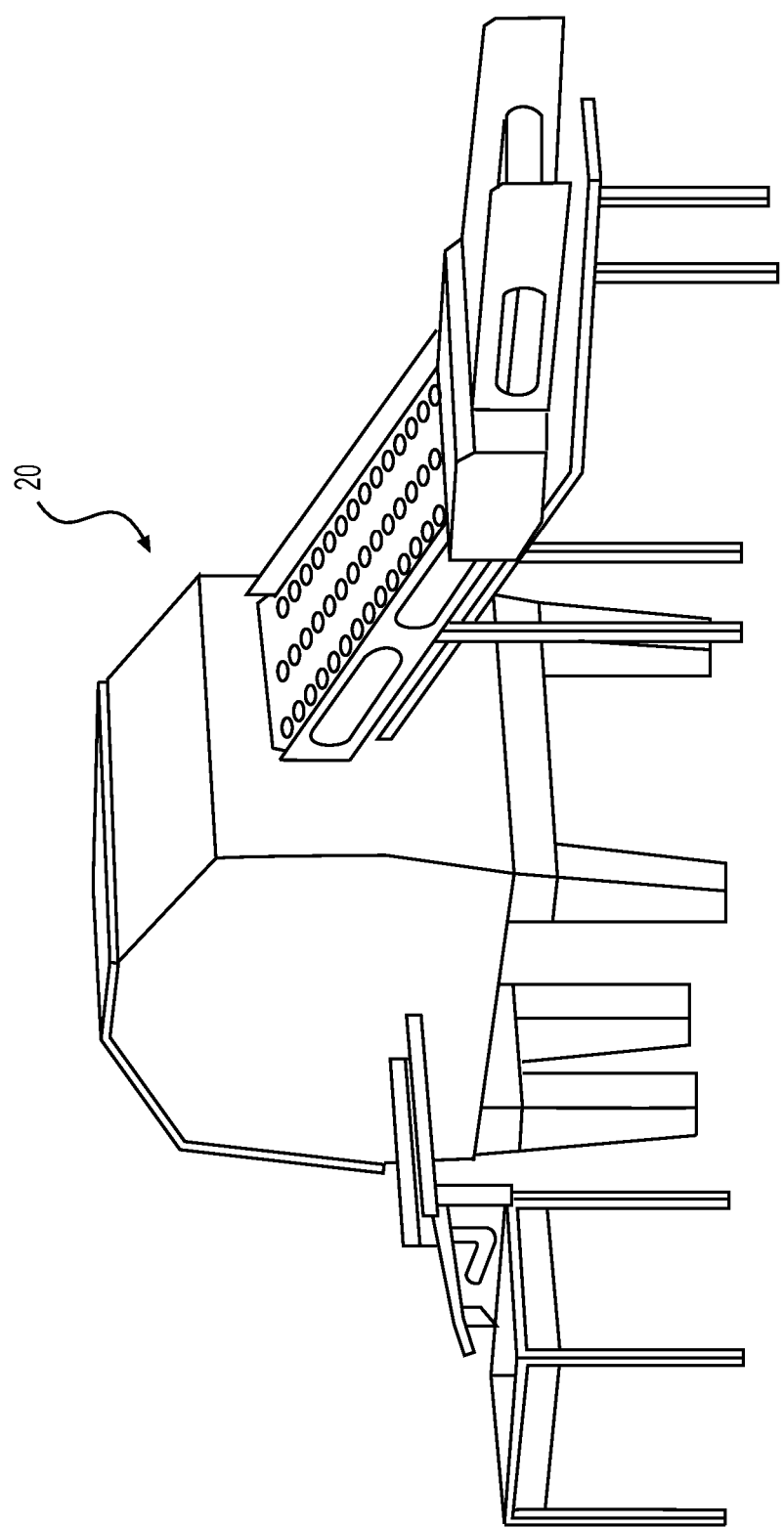
FIG. 1 is a perspective view of an egg-breaking system encompassing aspects of the present disclosure.

The present disclosure is directed to systems and methods for breaking eggs. In the commercial production of egg products, such as liquid eggs, egg whites, or other egg-containing products, eggs are fed through lines in which the eggs go through several processing steps, such as washing, cracking, yolk separation, and shell separation. The egg-breaking process can entail breaching the shell of the egg and separating the shell from the egg contents. The present disclosure provides egg-breaking systems that can optionally in some instances increase the throughput of an egg processing line and provide the ability to process more eggs within a given footprint or volume as compared to some other available egg-breaking systems.

As used herein, the term "cracker assembly array" refers to an array of four or more nodes fixedly-aligned relative to each other in three-dimensional space, wherein each node is designed to receive at least one egg therein.

As used herein, the term "node" refers to a definable unit of a cracker assembly array in which a portion of the egg-breaking process can be carried out and that is disposed within a defined volume of a cracker assembly array that is fixed relative to the other similarly defined units of a cracker assembly array and includes at least one egg holder, and wherein the defined portion of the system remains in its respective node during the egg-breaking process cycle. A node can include one or more egg holders, egg crackers, and/or supporting structures.

As used herein, the term "matrix" refers to the alignment of nodes in a cracker assembly array in a generally planar arrangement in more than one row and more than one column.

As used herein, the term "n×m" represents the number of rows and columns of nodes in the matrix of the cracker assembly array, wherein "n" represents the number of rows in the matrix and is a number greater than one, and "m" represents the number of columns in the matrix and is a number greater than one.

As used herein, the term "egg cracker" refers to any structure or device that is used to breach the shell of an egg. The term "egg cracker" encompasses solid structures that contact the eggshell during the egg-breaking process, as well as devices that impart force or energy to the shell sufficient to breach the shell. Such structures can include, but not limited to, knives, hammers, pins, hooks, wheels, chains, wires, combinations thereof, and other solid contacting structures. Such devices can include, but are not limited to, lasers, gas and/or liquid fluid ejectors, ultrasonic generators, heating elements, and other structures imparting force and/or energy to the eggshell, as well as combinations thereof.

As used herein, the term "fixedly-aligned node" refers to a node of a cracker assembly array that do not move relative to every other node of the cracker assembly array, but, optionally, can include one or more moving parts that can move relative to other nodes, or parts thereof, while remaining within its respective node.

As used herein, the term "egg conveyor" refers to structure for feeding a plurality of eggs to the cracker assembly array. An egg conveyor can include a belt, chain, chute, slide, ramp, suction cup, or other structure by which eggs can be transported to the cracker assembly array.

As used herein, the term "operably aligned" refers to an alignment of one part, such as an egg cracker, of the system, with another part, such as an egg holder, of the system, such that the process of breaking eggs can be conducted when the two parts are so aligned. Operably aligned parts may be so aligned alternatively at all times or for only a period of time in which a process step can be conducted.

FIG. 1 shows an egg-breaking system 20 that encompasses aspects of the present disclosure. The egg-breaking system 20 is generally configured to process a large number of whole eggs that are fed to the egg-breaking system 20 such that the whole eggs can be broken and their contents separated from their shells. The eggs that are to be processed are fed into a receiving bin and then engaged by a conveyor system, which as shown in FIG. 1, includes three conveyor belts conveying eggs up a ramp into the interior of the system for further processing.

Figure 2:
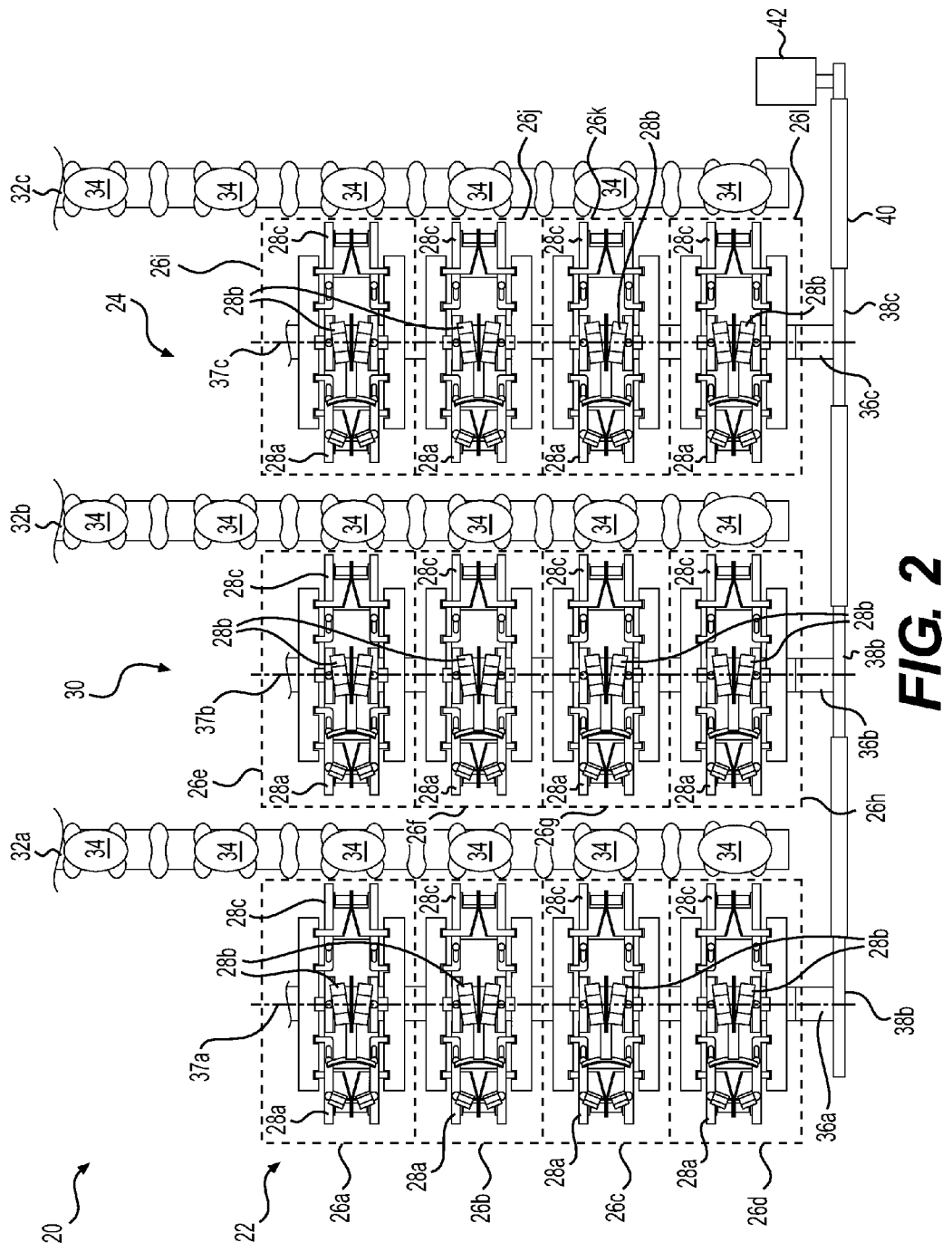
FIG. 2 is a plan view of an interior portion of the egg-breaking system shown in FIG. 1.
Figure 5:
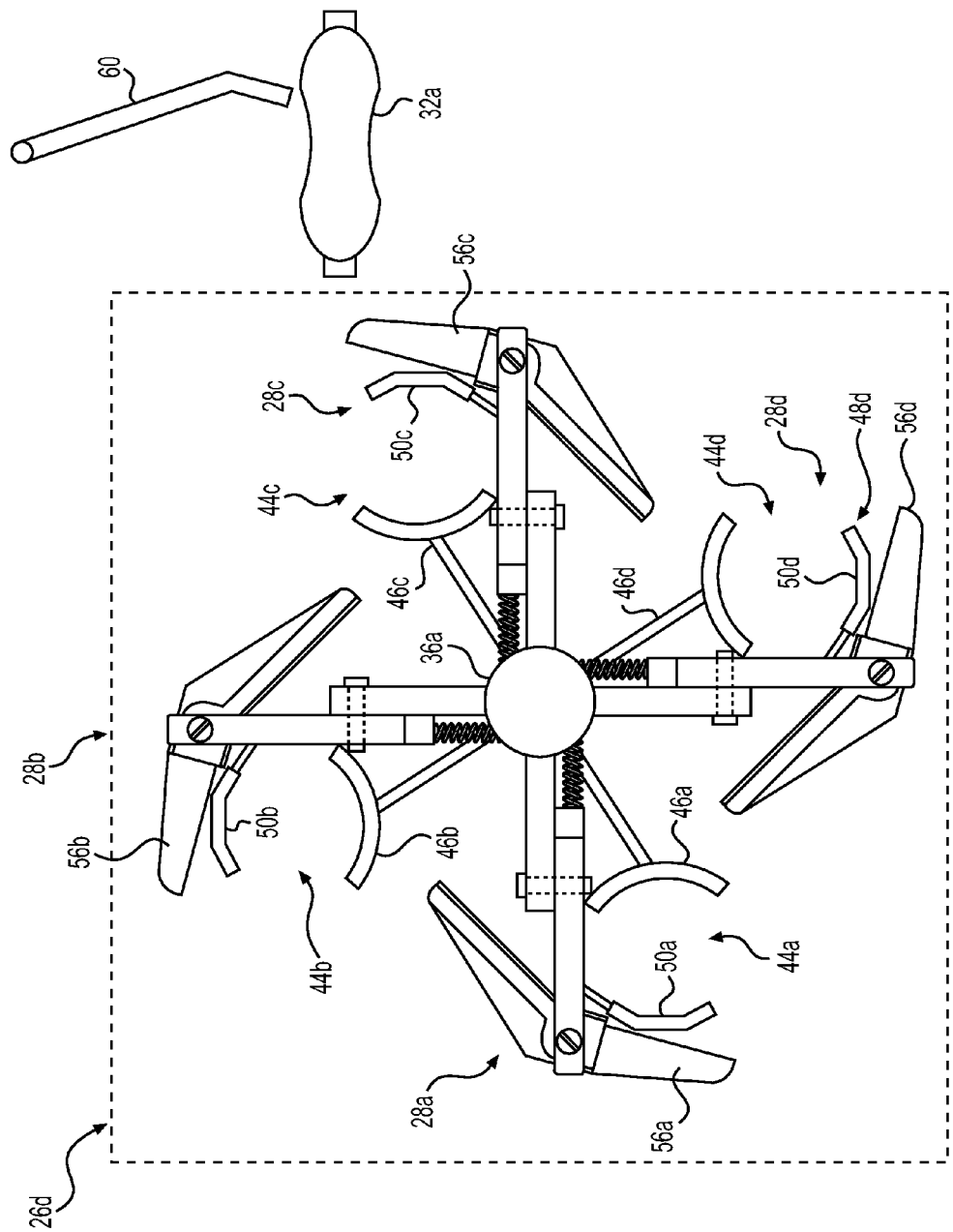
FIG. 5 is a side elevation view of a node of the cracker assembly array shown in FIG. 2 shown along with a conveyor and conveyor arm.
Figure 6:
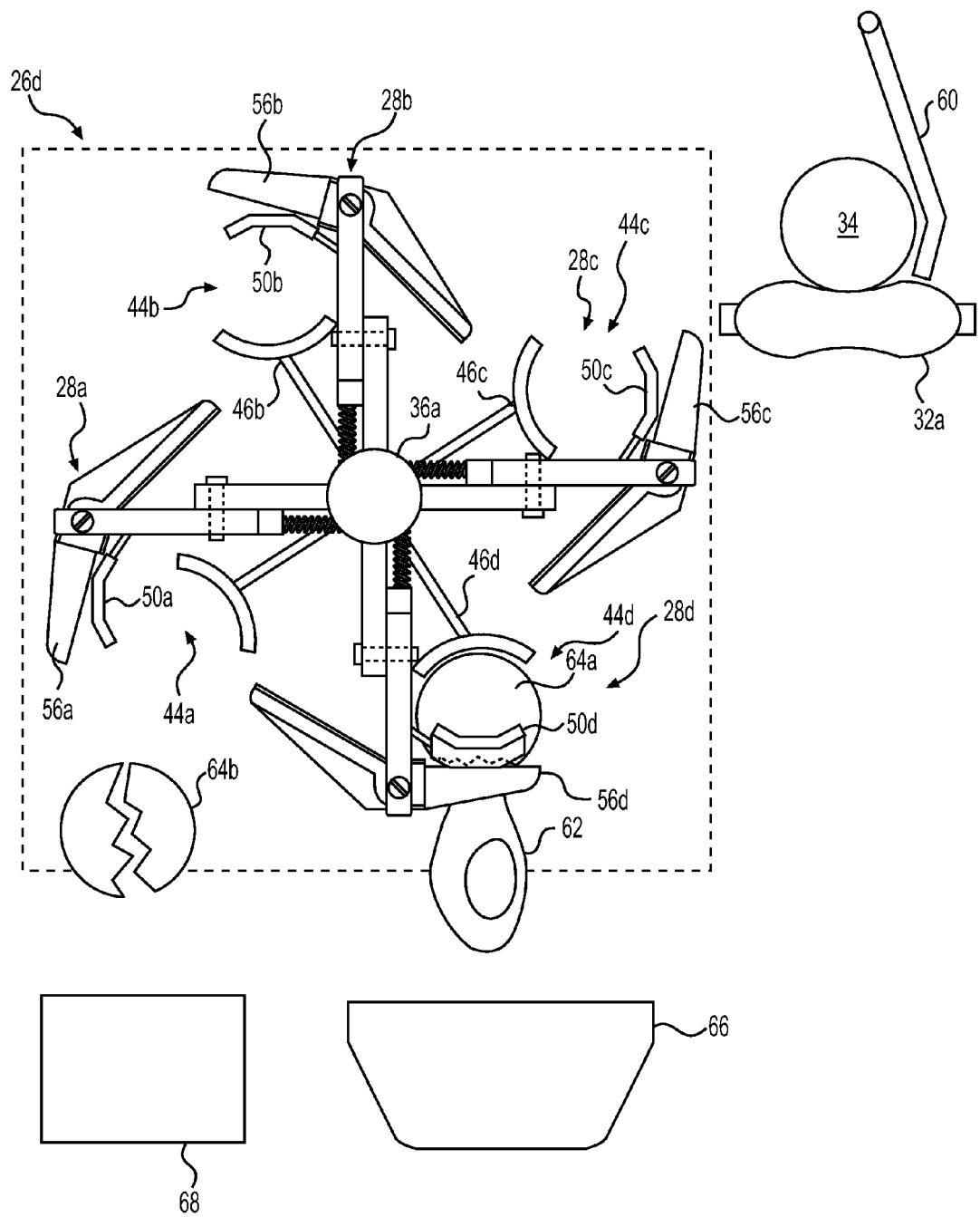
FIG. 6 is a side elevation view of the node shown in FIG. 5 with eggs being processed in the node.

As shown FIG. 2, the egg-breaking system 20 includes a cracker assembly array 22 that includes a plurality of nodes 24, that includes nodes 26a, 26b, 26c, 26d, 26e, 26f, 26g, 26h, 26i, 26j, 26k, and 26l. Each node 26a-l includes one or more cracker assemblies 28a, 28b, 28c, and 28d as shown in FIGS. 2, 5, and 6.

The plurality of nodes 24 of the cracker assembly array 22 is aligned within a matrix 30 within the egg-breaking system 20. The matrix 30 can be identified generally as an n×m matrix, wherein n represents the number of rows of nodes in the matrix 30 and m represents the number of columns of nodes in the matrix 30. As shown in FIG. 2, the matrix 30 includes four rows of nodes and three columns of nodes; accordingly, the matrix 30 can be referred to as a 4×3 matrix. The rows and/or columns of the matrix 30 can, in one aspect of the present disclosure, be equally spaced from each other;

or, alternatively, in another aspect of the present disclosure, may be spaced at different apart of varying distances from each other.

Eggs 34 are fed to each column of the 4×3 matrix by one of the egg conveyers 32a, 32b, and 32c. Each conveyor 32a, 32b, and 32c can comprise a belt, chain, or other structure known in the art for effectively conveying eggs. The egg conveyors 32a, 32b, and 32c can be operably aligned with the cracker assembly array 22, as shown in FIG. 2, so that each of the egg conveyors 32a, 32b, and 32c is operably aligned with more than one of the nodes 26a, 26b, 26c, 26d, 26e, 26f, 26g, 26h, 26i, 26j, 26k, and 26l of the cracker assembly array 22, whereby each of the egg conveyors 32a, 32b, and 32c can feed eggs 34 to more than one of the nodes with which the conveyor is operably aligned. The timing of each of the egg conveyors 32a, 32b, and 32c is synchronized with the respective cracker assemblies 28a, 28b, 28c, and 28d to feed eggs at the appropriate rate to allow for sufficient processing of each egg 34 in turn.

As shown in FIGS. 2, 5, and 6, each node 26a-26l the cracker assembly array 22 includes four cracker assemblies 28a, 28b, 28c, and 28d mounted along one of the shafts 36a, 36b, and 36c. The four cracker assemblies 28a, 28b, 28c, and 28d of each node are aligned at ninety-degree intervals around one of the shafts 36a, 36b, and 36c. Each of the shafts 36a, 36b, and 36c is operated by one of the sprockets 38a, 38b, or 38c operably engaged to each of the shafts and a chain 40 movably connected to a motor 66. Alternative modes of moving and controlling the cracker assemblies are contemplated by the present disclosure.

Each shaft 36a, 36b, and 36c has one of the three axis 37a, 37b, and 37c extending therethrough. Each of the three axis 37a, 37b, and 37c extends through more than one node of the cracker assembly array 22. The cracker assemblies 28a, 28b, 28c, and 28d of each node rotate about one of the axis 37a, 37b, and 37c as they rotate about the shafts 36a, 36b, and 36c. Providing a cracker assembly array with multiple axes rotation for the movement of the cracker assemblies can, in some cases, increase the total achievable throughput of eggs in a given volume.

Figure 4:
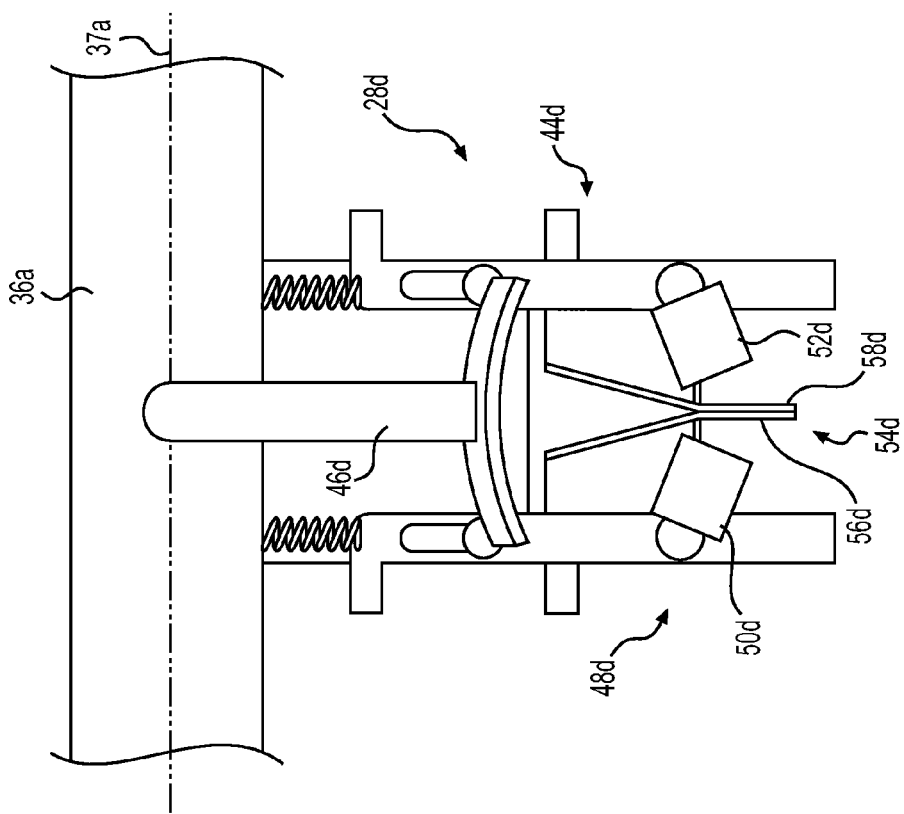
FIG. 4 is a front elevation view of the single cracker assembly shown in FIG. 3 with the egg removed.
Figure 3:
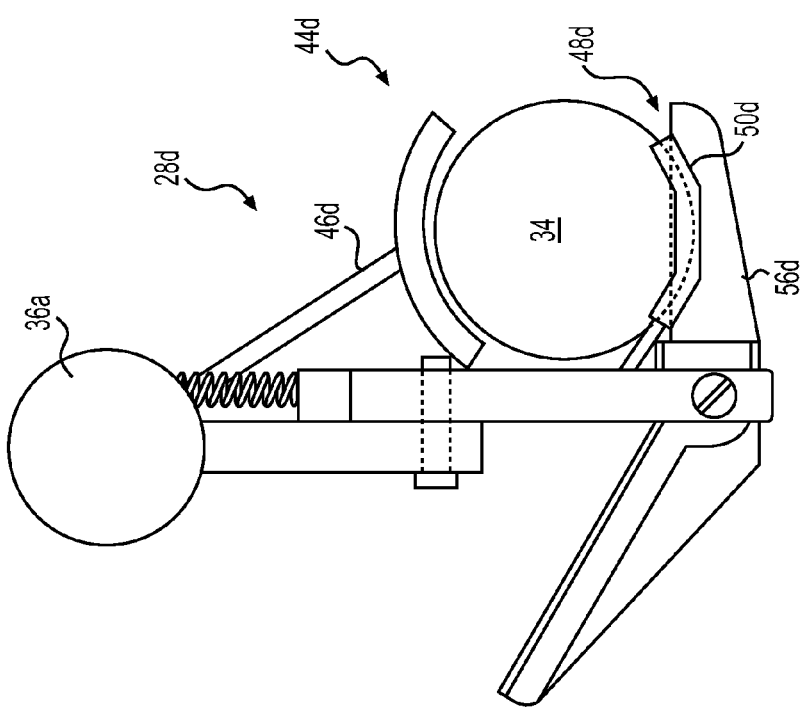
FIG. 3 is side elevation view of a single cracker assembly of the type shown in the cracker assembly array shown in FIG. 2, wherein the cracker assembly is mounted to a shaft.

As shown in FIGS. 3 and 4, the cracker assembly 28d is mounted to the shaft 36a and includes an egg holder 44d. The egg holder 44d comprises a top arm 46d that cooperates with the egg cradle 48d to align an egg 34 in position within the cracker assembly 28d for processing. The top arm 46d can be either fixed or movable. The egg cradle 48d comprises a first movable arm 50d and a second movable arm 52d. The first and the second movable arms 50d and 52d form a seat for an egg and cooperate to support an egg when the egg is disposed within the egg holder 44d of the cracker assembly 28d. Although a single cracker assembly 28d is shown in FIGS. 3 and 4, the other cracker assemblies 28a, 28b, and 28c of each of the nodes 26a-26l can include similar structures for carrying out egg processing including the breaking of the shell, removal of the contents, and discarding of the shell.

An egg cracker 54d is operably aligned with the egg holder 44d. A portion of the egg cracker 54d is disposed generally below and between the first and second movable arms 50d and 52d of the egg cradle 48d. In this embodiment, the egg cracker 54d comprises a first knife 56d and a second knife 58d. Each of the first and second knives 56d and 58d are operably aligned with the egg holder 44d so as to be able to breach an egg 34. The pair of knives 56d and 58d and 48 is movable so as to allow an egg to be firmly seated within the egg holder 44d prior to being breached by the knives. The first and the second knives 56d and 58d are further movable away from each other so as to allow the contents of the egg to pass therebetween after the shell of the egg has been breached.

FIG. 5 shows a single node 26d of the cracker assembly array of an egg-breaking system of the present disclosure and the node's relative alignment with a conveyor 32a and conveyor arm 60. The node 26d includes four cracker assemblies 28a, 28b, 28c, and 28d, each of which are mounted to shaft 36a, which rotates and thereby provides for the rotation of each of the cracker assemblies 28a, 28b, 28c, and 28d. Each cracker assembly includes an egg holder 44a, 44b, 44c, and 44d, that, in turn, each comprise a movable arm 46a, 46b, 46c, and 46d that engages a portion of an egg to hold the egg in place within the respective egg holder 44a, 44b, 44c, and 44d. Each egg holder 44a, 44b, 44c, and 44d further comprises an egg cracker, which, as shown in FIG. 5 includes a first knife 56a, 56b, 56c, and 56d. The egg cracker of each cracker assembly also includes a second knife, not shown. The egg conveyor 32a is aligned generally above and to the side of the node 26d. The conveyor 32a conveys egg to position adjacent the node 26d. The conveyor arm 60 is operably aligned with the conveyor 32a and the node 26d so as to push eggs off the conveyor 32 *a* into the egg holders 44a, 44b, 44c, and 44d of the cracker assemblies 28a, 28b, 28c, and 28d. Each cracker assembly 28a, 28b, 28c, and 28d is aligned in a position about the shaft 36a approximately ninety degrees displaced from the adjacent cracker assemblies. The movable components of each of the cracker assemblies are configured to operably engage cams, springs and other parts of the assembly so as to move in a coordinated manner to be in the appropriate position when the particular cracker assembly is at a given position about the axis of the shaft 36a.

FIG. 6 shows the node 26d of the cracker assembly array during the egg-breaking process. During the egg-breaking process, eggs 34 are fed to the node 26d by the conveyor 32a. The conveyor arm 60 pushes eggs 34 off the conveyor and into the cracker assembly 28c that is aligned generally in a horizontal position adjacent the conveyor 32a. The cracker assembly 28c is generally in the three o'clock position relative to the shaft 36a. The movable arm 46c moves to receive an egg into the egg holder 44c. As the shaft 36a rotates clockwise, the cracker assembly 28c also rotates clockwise and downward from the three o'clock position to towards the six o'clock position. During the rotation, the movable arm moves to hold an egg in position with the cooperation of the egg cradle.

As the cracker assembly 28c rotates, the egg cracker breaches the shell of the egg. The arms of the egg cradle, the first arm 50c being visible in FIG. 6, move apart to allow the first knife 56c and the second knife, not shown, to move apart to allow the egg contents to separate from the egg shell. Once the cracker assembly is generally in the six o'clock position, as cracker assembly 28d is in FIG. 6, the egg contents 62 is separated from the egg shell 64a and pass between the knives 56d shown. The egg contents 62 fall by gravity into the receiving cup 66. Depending upon the arrangement of the egg-breaking system, the receiving cup 66 can be designed either to separate the yolk from the egg white or to keep the yolk and whites together for further processing.

As the shaft 36a rotates the cracker assemblies 28a, 28b, 28c, and 28d eventually move to the nine o'clock position. As the cracker assemblies move to this position, the eggshell 64b is ejected from the cracker assembly 28a and is directed to the shell conveyor 68, which removes the shells from the system. The cracker assemblies continue to rotate from the nine o'clock position and the components of each cracker assembly recharge to be in proper alignment to receive another egg 34 from the conveyor 32a.

Figure 7:
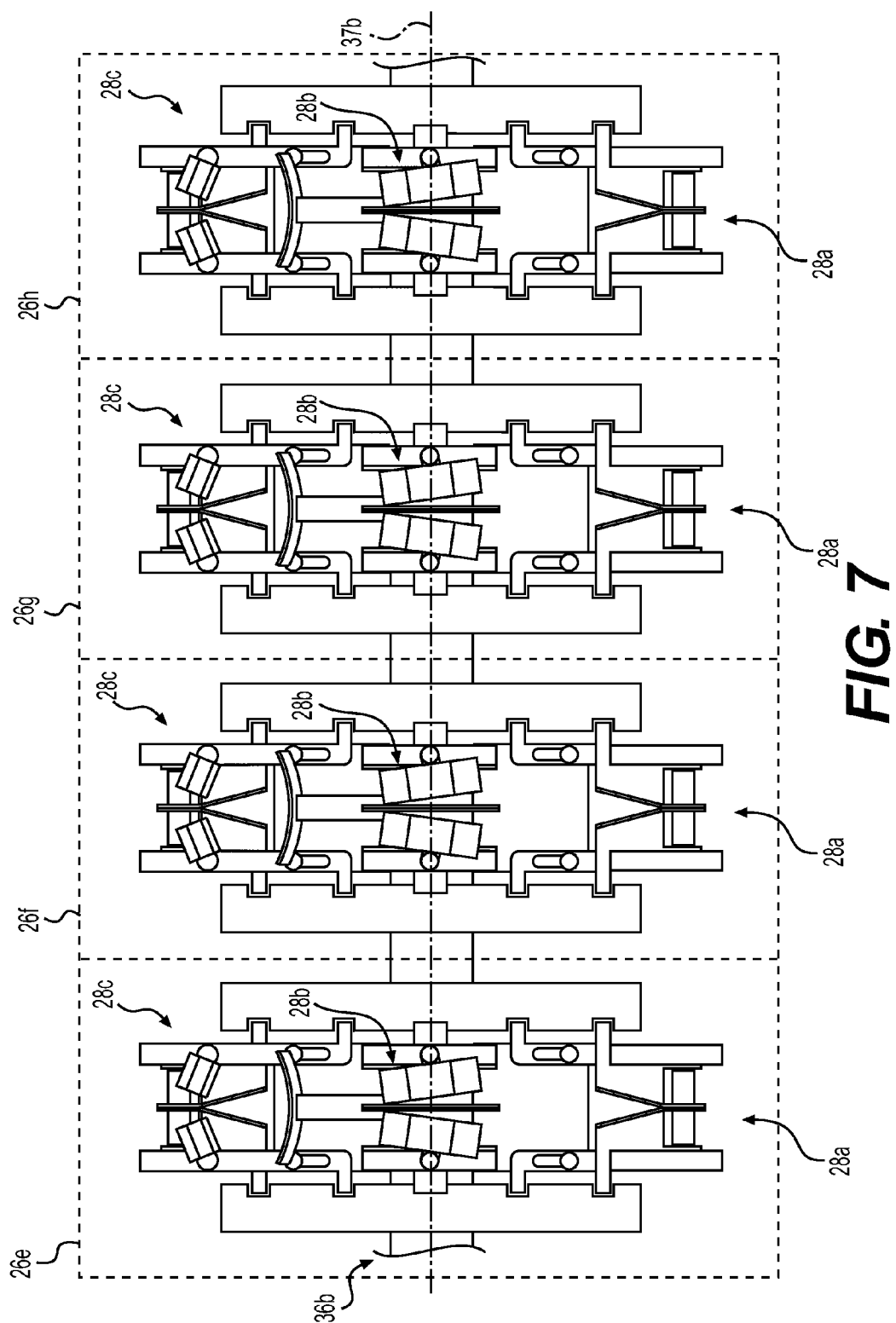
FIG. 7 is a plan view of three nodes of the cracker assembly array shown in FIG. 2.

As shown in FIG. 7, the nodes 26e, 26f, and 26g are fixedly-aligned relative to each other within the cracker assembly array. The cracker assemblies 28a, 28b, and 28c of each of the nodes 26e, 26f, and 26g moves as the shaft 36b rotates about the axis 37b, but the nodes 26e, 26f, and 26g do not move relative to each other. The present disclosure encompasses egg-breaking systems in which the nodes of a cracker assembly array do not move relative to each other, even though one or more parts of each of the nodes do move.

Figure 8:
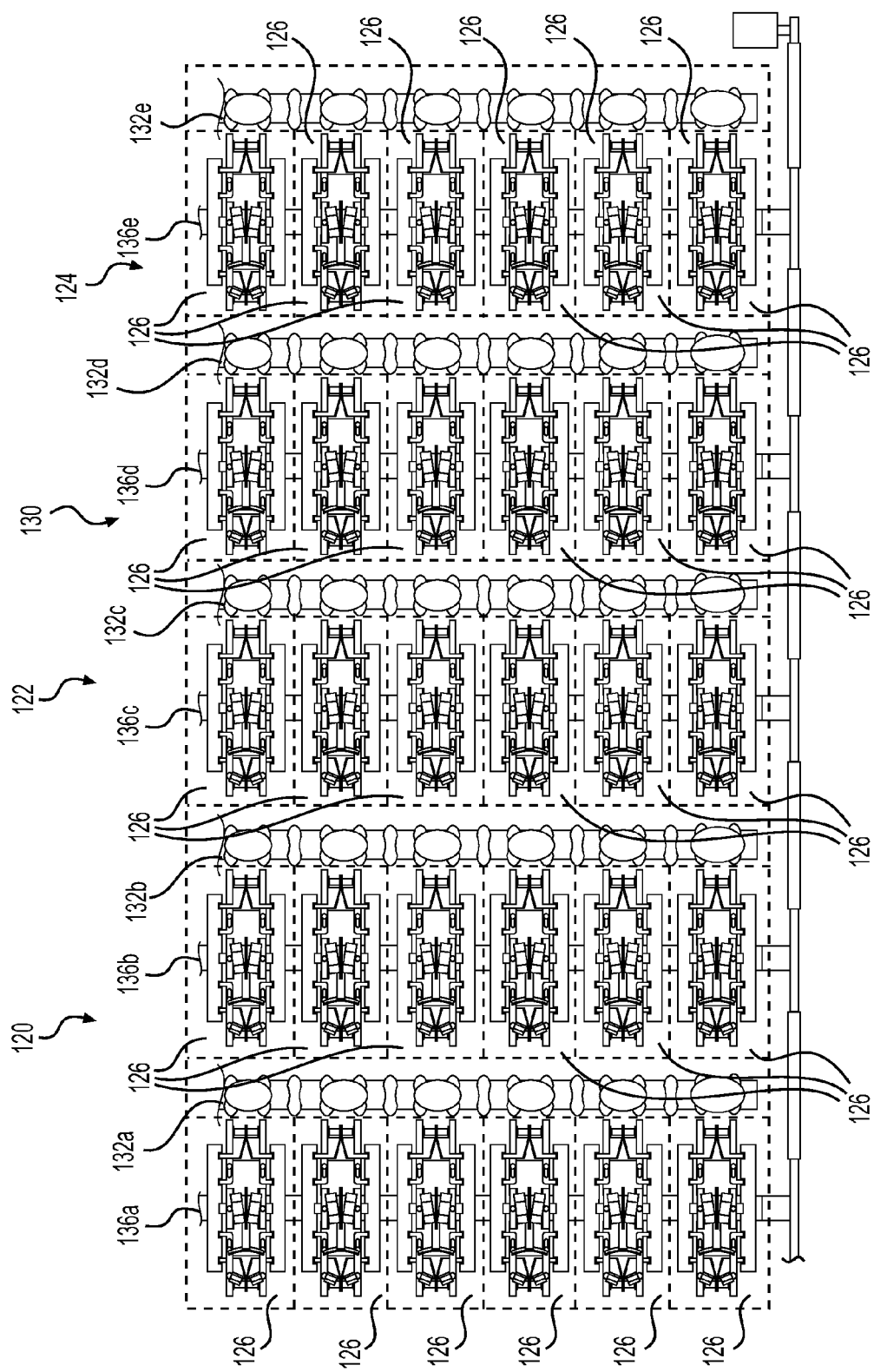
FIG. 8 is a plan view of a cracker assembly array of another embodiment of an egg-breaking system encompassing aspects of the present disclosure.

As shown in FIG. 8, the present disclosure encompasses egg-breaking systems comprising cracker assembly arrays of varying size. The egg-breaking system 120 includes a cracker assembly array 122 comprising a plurality of nodes 124. The cracker assembly array 122 includes a 6×5 matrix 130 of nodes 126 that includes six rows and five columns of nodes. As with the cracker assembly array 22 shown in FIG. 2, each node 126 of the cracker assembly array 122 shown in FIG. 8 includes four cracker assemblies rotatably mounted on one of the shafts 136a, 136b, 136c, 136d, and 136e.

The present disclosure encompasses egg-breaking systems comprising a cracker assembly array with an n×m matrix of nodes wherein n and m are greater than one. Furthermore, the present disclosure encompasses egg-breaking systems comprising a cracker assembly array with an n×m matrix of nodes wherein at least one of n and m is greater than two. In still a further aspect, the present disclosure encompasses egg-breaking systems comprising cracker assembly arrays with an n×m matrix of nodes wherein both n and m are greater than two. In another aspect, the present disclosure encompasses egg-breaking systems wherein a cracker assembly array comprising an n×m matrix of nodes includes a value of n in the range of about two to eighteen and a value of m in a range of about two to eighteen. Indeed, the present disclosure encompasses egg-breaking systems with cracker assembly arrays including matrices as large as 12×12. In another aspect, the present disclosure encompasses egg-breaking systems with cracker assembly arrays as large as 18×18. Alternative embodiments with smaller matrices are also encompassed herein.

Figure 9:
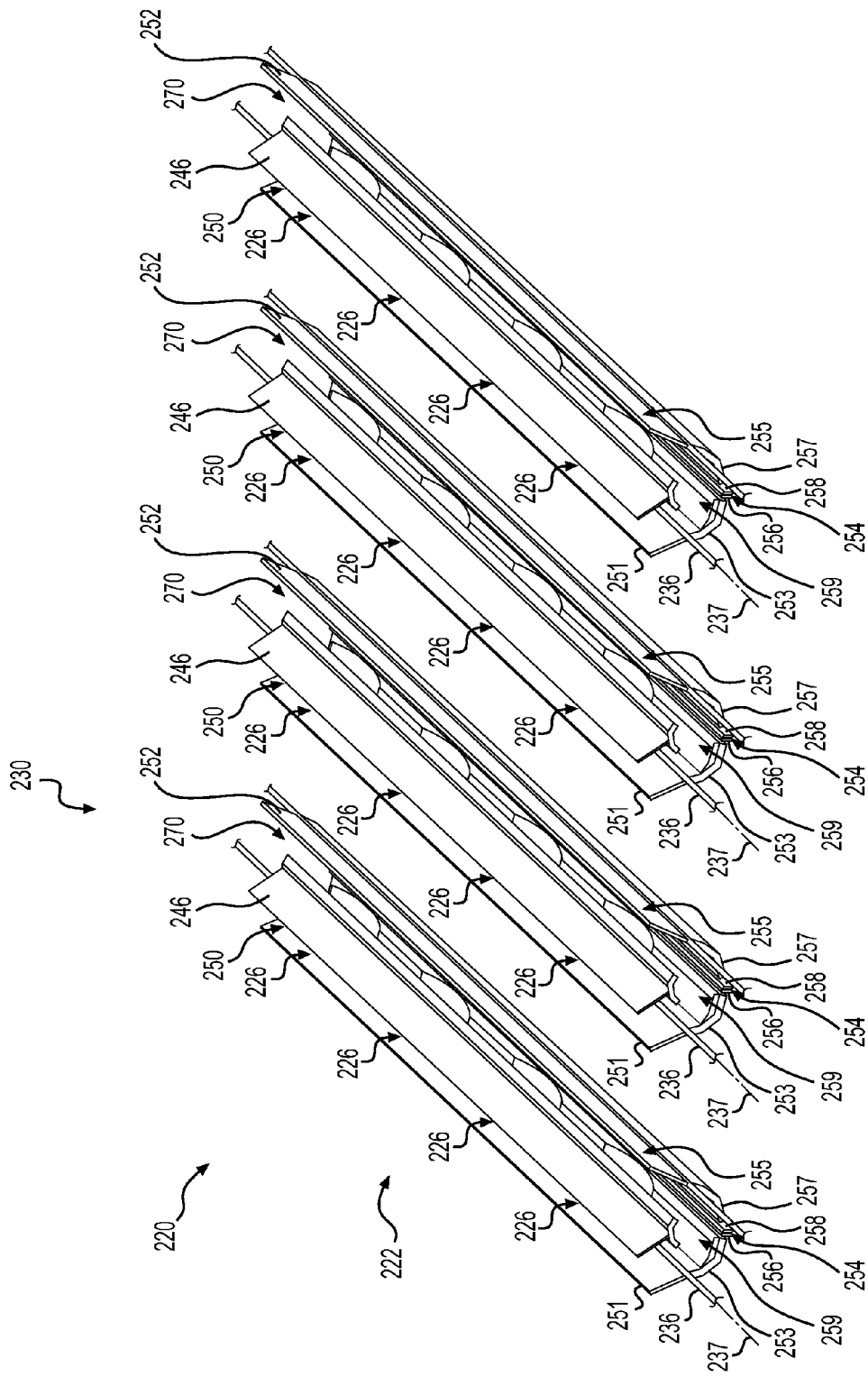
FIG. 9 is a perspective view of a cracker assembly array of yet another embodiment of an egg-breaking system encompassing aspects of the present disclosure with conveyors removed for clarity.

As shown in FIG. 9, the present disclosure encompasses another embodiment of an egg-breaking system 220. The cracker assembly array 222 of the egg-breaking system 220 includes a plurality of trays 270. In this embodiment, each node 226 includes a single cracker assembly. However, other embodiments of the egg-breaking systems that include trays within the cracker assembly array can include nodes with more than one cracker assembly within each node. Each tray 270 includes more than cradle, each of which can hold one egg. Each tray 270 is formed by the cooperation of a first support 250 and a second support 252. Each of the first and second supports 250 and 252 are mounted on a shaft 236. Each first support 250 includes a first upper wall 251 and a first support arm 253. Each second support 252 includes a second upper wall 255 and a second support arm 257. The first and second support arms 253 and 257 are movable about an axis 237 extending through the shafts 236. Each of the first and the second support arms 253 and 257 has a plurality of spaced shoulders 259 formed thereon. Every other pair of shoulders cooperate to form a partial seat on one of the support arms. When cooperating with the opposed support arm of the tray in which they are disposed, the support arms form full seats between the shoulders formed thereon. These seats act as cradles to receive the eggs for the egg-breaking process. The first and the second upper walls 251 and 255, in one embodiment, can be angle outward to act as guide ramps to guide eggs being fed to the trays 270.

The egg-breaking system 220 also includes more than one movable arm 246 configure to hold eggs in place when the eggs are disposed within the cradles formed in a tray 270. The movable arm 246 is configured to operably engage more than one egg at a time. As shown in FIG. 9, the movable arm 246 can engage every egg disposed within a tray 270. The movable arms 246 are rotatable about an axis that is generally perpendicular to the axes 237 extending through the shafts 236.

The egg-breaking system 220 also includes more than one egg cracker 254 operably aligned with the trays 270. As shown in FIG. 9, the egg cracker 254 comprises a first knife 256 and a second knife 258. The blades of the first and the second knives 256 and 258 extend the length of each tray 270. The egg cracker 254 is aligned generally within a gap formed by the first and the second support arms 253 and 257 of each tray 270. Each egg cracker 254 can engage more than one egg disposed within the cradles of the trays 270 simultaneously so as to breach the shell of each egg.

A plurality of nodes 226 are provided in the cracker assembly array 222. The nodes 226 are arranged to form an n×m matrix 230. As shown in FIG. 9, the matrix 230 is a 4×5 matrix formed of four rows and four columns.

FIG. 10 illustrates a node 226 of the cracker assembly array 222 in which an egg 34 is aligned in a tray 270 in position ready for cracking by the egg cracker 254. The egg cracker 254 comprises a first knife 256 and a second knife 258. The tray 270 comprises a first support 250 and a second support 252 which cooperate to form seat that receives the egg 34 and aligns the egg 34 over the egg cracker 254 for breaking. The first support 250 comprises a first top wall 251 and a first movable arm 253. Likewise the second support 252 includes a second top wall 255 and a second movable arm 257. The first and second support arms 253 and 257 are rotatable about an axis 237 extending through each shaft 236 to which the respective support arm is attached. The first and the second knives 256 and 258 are aligned adjacent to each other below a central portion of the egg 34 and between the first support arm 253 and the second support arm 257

As shown in FIG. 11, a conveyor 232 is operably aligned with the second support 252 of a tray of the cracker assembly array of the present disclosure in order to allow eggs 34 to be fed to nodes 236 of the cracker assembly array. Each egg 34 is disposed in a seat formed by the second support arm 257 and a first support arm (not shown). Both the first and the second support arms includes a plurality of shoulders 259 formed thereon. The shoulders 259 formed on each support arm cooperate to form a seat in each node 226 in which an egg can be positioned for processing. Each node 226 includes a first pair of shoulders formed on a first support arm (not shown) and a second pair of shoulders formed on the second support arm 257. The second support arm 257 is movably mounted to the shaft 236 through which the axis 237 extends. The shaft 236 extends through more than one node 226 of the cracker assembly array and can extend through a plurality of nodes 226. Likewise, the axis 237 extends through more than one node 226 and can extend through a plurality of the nodes 226.

FIGS. 12A-12D illustrate the cycle in which an egg 34 can be broken in the cracker assembly array 222. In FIG. 12A, an egg 34 fed from a conveyor (not shown) into node 226. The second upper wall 255 can help to guide the egg into the cradle formed in the node 226. The movable arm 246 is elevated during the processing cycle via cams or other suitable means to allow the egg 34 to fall into the seat formed by the first support arm 253 and the second support arm 257. FIG. 12B shows the egg 34 positioned within the seat of the node 226 supported by the first support arm 253 and the second support arm 257. A gap is formed between the first support arm 253 and the second support arm 257 exposing a central portion of the egg 34. An egg cracker 254 is disposed generally between and below the first support 250 and the second support 252 and includes a first knife 256 and a second knife 258. As shown in FIG. 12C, the egg cracker 254 moves upward to engage the egg 34. Both the first knife 256 and the second knife 258 strike the shell of the egg 34 to crack the shell. As shown in FIG. 12D, the first knife 258 and the second knife 258 move away from each other while engaging the shell 64 of the egg 34. Rotating about shafts 236, the first support arm 253 and the second support arm 257 also pivot away from each other to allow the knives 256 and 258 to move apart sufficiently to allow the egg contents 62 pass therebetween. As shown in FIG. 12E, once the egg contents has been removed, the first support arm 253 and the second support arm 257 rotate farther away from each other to allow further movement of the first and second knives 256 and 258 away from each other, so that the knives disengage the egg shell 64, which then passes between the separated knives. The system then moves into position to receive another egg to repeat the egg-breaking cycle.

Figure 13:
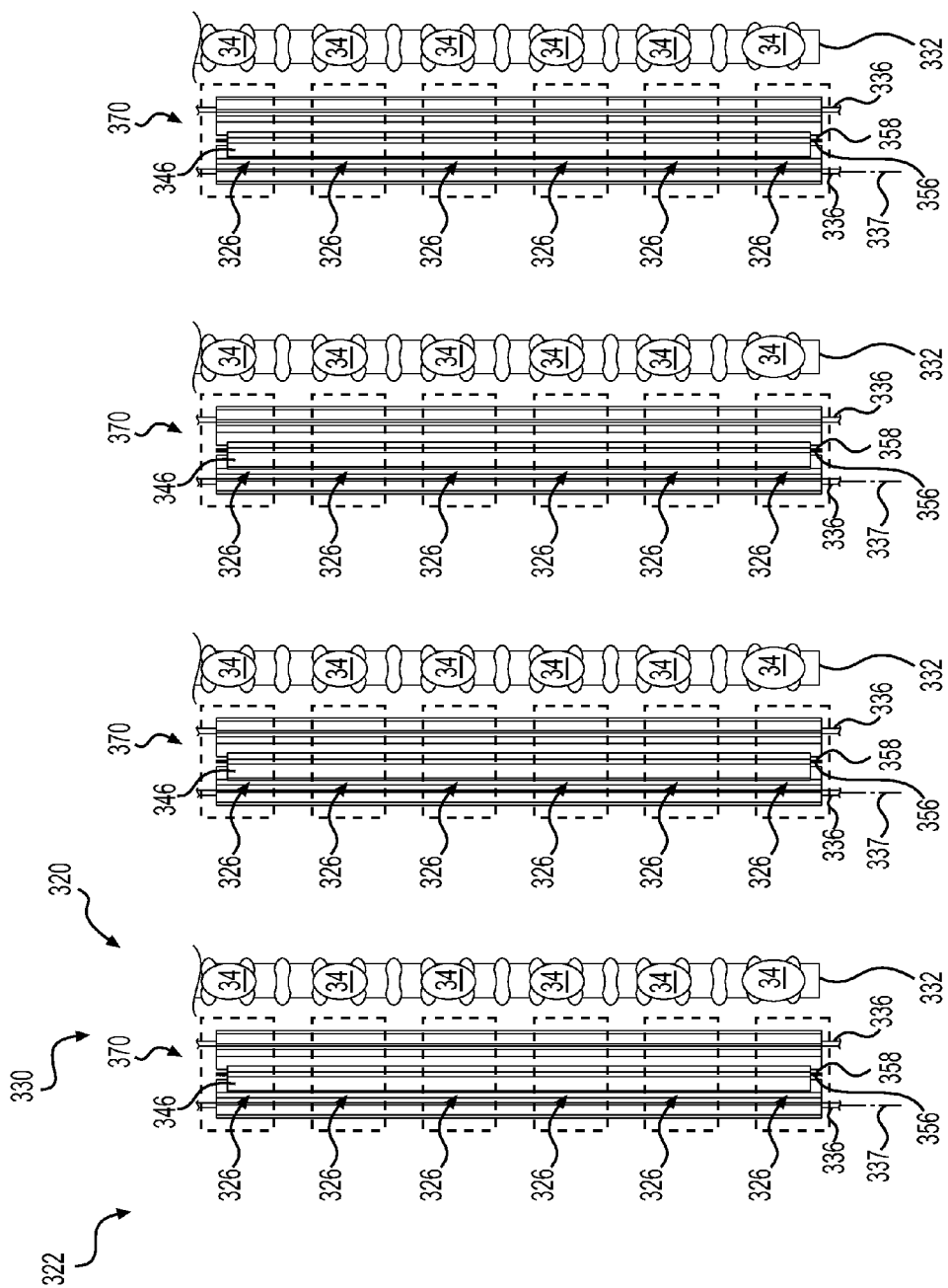
FIG. 13 is a plan view of a portion of a cracker assembly array of another embodiment of an egg-breaking system encompassing aspects of the present invention.

FIG. 13 shows another embodiment of an egg-breaking system 320 encompassing aspects of the present disclosure. Similar to the egg-breaking system 220 shown in FIG. 9, the egg-breaking system 320 shown in FIG. 13 includes a cracker assembly array 322 that includes a matrix 330 of nodes 326. The cracker assembly array 322 includes five trays 370 aligned generally parallel to each other. Operably aligned with each tray 370 is a conveyor 332 that can feed eggs 34 to one of the trays 370. The trays 370 have shafts 336 extending therethrough which allow for the rotation of portions of each tray about axis 337. Operably aligned with each tray 370 is a pair of knives 356 and 358 whose blades are aligned adjacent to each other and which extend the length of the trays 370. Also operably aligned with each tray 370 is a movable arm 346 that can cooperate with the trays 370 to hold eggs in each node of the cracker assembly array 322. The cracker assembly array 322 includes 30 nodes arranged in a 6×4 matrix.

The present disclosure contemplates and encompasses modifications and variations to the apparatus and methods disclosed herein.

What is claimed is:

1. An egg-breaking system comprising:
a cracker assembly array comprising a plurality of shafts and a plurality of nodes, wherein the plurality of nodes is aligned in an n×m matrix, wherein n is a first value in the range of three to eighteen and m is a second value in the range of two to eighteen, wherein the plurality of nodes is aligned in n rows and m columns in the n×m matrix, wherein each node of the plurality of nodes comprises a plurality of cracker assemblies, wherein each cracker assembly of the plurality of cracker assemblies comprises an egg holder and an egg cracker, wherein each cracker assembly of the plurality of cracker assemblies is rotatably mounted to a shaft of the plurality of shafts, wherein each column of the m columns in the n×m matrix comprises a shaft of the plurality of shafts, wherein the plurality of shafts is aligned planar, and wherein each shaft of the plurality of shafts maintains planar alignment with the plurality of shafts during egg-breaking; and,
a plurality of egg conveyors, wherein each egg conveyor of the plurality of egg conveyors is operably aligned with a column of the n×m matrix to feed an egg to each cracker assembly of the plurality of cracker assemblies of each node of the column.

2. The system of claim 1, further comprising a motor, wherein each shaft of the plurality of shafts is movably connected to the motor to rotate each shaft.

3. The system of claim 1, wherein the plurality of cracker assemblies of each node of the plurality of nodes comprises four cracker assemblies.

4. The system of claim 1, wherein each egg conveyor of the plurality of egg conveyors is aligned parallel to the shaft of the column to which the egg conveyor feeds eggs.

5. The egg-breaking system of claim 1, wherein each plurality of cracker assemblies rotates about an axis extending through a shaft of the plurality of shafts.

6. The egg-breaking system of claim 1, wherein each egg holder comprises an egg cradle operably aligned with a movable arm, wherein the egg cradle and the movable arm cooperate to receive and hold an egg in the egg holder.

7. The egg-breaking system of claim 1, further comprising a cup operably aligned with a node of the plurality of nodes to receive an egg contents from the node.

8. The egg-breaking system of claim 1, further comprising a shell conveyor operably aligned with a node of the plurality of nodes to receive an eggshell from the node.

9. The egg-breaking system of claim 1, wherein each egg conveyor of the plurality of egg conveyors comprises a belt.

10. The egg-breaking system of claim 1, wherein each egg cracker comprises a first knife.

11. The egg-breaking system of claim 10, wherein each egg cracker comprises a second knife.

12. The egg-breaking system of claim 2, further comprising a chain operably connected to the motor and each shaft of the plurality of shafts, wherein each egg conveyor of the plurality of egg conveyors is aligned perpendicular to the chain.

13. An egg-breaking system comprising:
a cracker assembly array comprising a plurality of shafts and a plurality of nodes, wherein the plurality of nodes is aligned in an n×m matrix, wherein n is a first number in a range of three to eighteen and m is a second number a range of two to eighteen, wherein the plurality of nodes is aligned n rows and m columns in the n×m matrix, wherein each node of the plurality of nodes comprises a plurality of egg cracker assemblies, wherein each egg cracker assembly of the plurality of egg cracker assemblies comprises an egg holder and an egg cracker, wherein each egg cracker comprises a knife, wherein each column of the m columns comprises a shaft of the plurality of shafts extending through each node of the column, wherein the egg holder and the egg cracker of each cracker assembly of the plurality of cracker assemblies of each node of the column is mounted to the shaft, wherein each shaft of the plurality of shafts is planar aligned, and wherein each shaft of the plurality of shafts maintains planar alignment with the plurality of shafts during egg-breaking; and,
a plurality of egg conveyors operably aligned with the cracker assembly array to feed eggs to each node of the n×m matrix, wherein each egg conveyor of the plurality of egg conveyors is aligned parallel to a column of the m columns to feed an egg to each cracker assembly of each node of the column.

14. The egg-breaking system of claim 13, wherein each node of the plurality of nodes comprises four cracker assemblies.

15. An egg-breaking system comprising:
a cracker assembly array comprising a plurality of shafts and a plurality of nodes, wherein the plurality of nodes is aligned in an n×m matrix, wherein n is a first value in the range of three to eighteen and m is a second value in the range of two to eighteen, wherein the plurality of nodes is aligned in n rows and m columns in the n×m matrix, wherein each node of the plurality of nodes comprises a plurality of cracker assemblies, wherein each cracker assembly of the plurality of cracker assemblies comprises an egg holder and an egg cracker, wherein the egg cracker comprises a first knife and a second knife, wherein each cracker assembly of the plurality of cracker assemblies is rotatably mounted to a shaft of the plurality of shafts, wherein each cracker assembly of the plurality of cracker assemblies rotates about an axis extending through a shaft of the plurality of shafts, wherein each column of the m columns in the n×m matrix comprises a shaft of the plurality of shafts, wherein the plurality of shafts is aligned planar, and wherein each shaft of the plurality of shafts maintains planar alignment with the plurality of shafts during egg-breaking; and a plurality of egg conveyors, wherein each egg conveyor of the plurality of egg conveyors is operably aligned with a column of the n×m matrix to feed an egg to each cracker assembly of the plurality of cracker assemblies of each node of the column, wherein each egg conveyor of the plurality of egg conveyors comprises a belt, and wherein the belt is aligned parallel with a shaft of the plurality of shafts.

* * * * *